(12) United States Patent
Khoukhi et al.

(10) Patent No.: US 8,478,005 B2
(45) Date of Patent: Jul. 2, 2013

(54) METHOD OF PERFORMING FACIAL RECOGNITION USING GENETICALLY MODIFIED FUZZY LINEAR DISCRIMINANT ANALYSIS

(75) Inventors: Amar Khoukhi, Dhahran (SA); Syed Faraz Ahmed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 255 days.

(21) Appl. No.: 13/084,406

(22) Filed: Apr. 11, 2011

(65) Prior Publication Data

US 2012/0257798 A1    Oct. 11, 2012

(51) Int. Cl.
*G06K 9/00* (2006.01)

(52) U.S. Cl.
USPC ........................................... 382/118

(58) Field of Classification Search
USPC ......... 382/115, 117, 118, 155–161, 224–228; 706/2–9, 15, 16, 20, 22, 23, 24, 41, 43; 128/924, 128/925
See application file for complete search history.

(56) References Cited

U.S. PATENT DOCUMENTS

| | | | |
|---|---|---|---|
| 5,251,288 A | 10/1993 | Nomura et al. | |
| 5,727,130 A | 3/1998 | Hung | |
| 5,842,194 A * | 11/1998 | Arbuckle | 706/52 |
| 6,094,646 A | 7/2000 | Runkler et al. | |
| 6,578,017 B1 | 6/2003 | Ebersole et al. | |
| 6,853,991 B1 | 2/2005 | Kermani | |
| 7,529,722 B2 | 5/2009 | Kofman et al. | |
| 2003/0169906 A1* | 9/2003 | Gokturk et al. | 382/115 |
| 2009/0276391 A1 | 11/2009 | Kofman et al. | |

FOREIGN PATENT DOCUMENTS

CN    101447020 (A)    6/2009
WO    WO0077773 (A1)    12/2000

OTHER PUBLICATIONS

Keun-Chang Kwak and Witold Pedrycz, "Face recognition using a fuzzy fisherface classifer", *Pattern Recognition*, 38 (2005) 1717-1732.
Virendra P. Vishwakarma, Sujata Pandey and M. N. Gupta, "Fuzzy based Pixel wise Information Extraction for Face Recognition", *IACSIT International Journal of Engineering and Technology*, vol. 2, No. 1, Feb. 2010.
Amer Khoukhi and S.F. Ahmed, Fuzzy LDA for face recognition with GA based optimization, 1-6. In *Fuzzy Information Processing Society (NAFIPS)*, 2010 Annual Meeting of the North American, Jul. 12-14, 2010.

* cited by examiner

*Primary Examiner* — Brian Le
(74) *Attorney, Agent, or Firm* — Richard C. Litman

(57) ABSTRACT

The method of performing facial recognition using genetic algorithm-modified fuzzy linear discriminant analysis (LDA) is based on the Fisherface LDA, with a modification being made in calculation of the membership function. Particularly, the membership function is computed using a pair of parameters $\alpha$ and $\beta$, which are optimized by a genetic algorithm in order to minimize the recognition error.

12 Claims, 13 Drawing Sheets

METHOD OF PERFORMING FACIAL RECOGNITION USING GENETICALLY MODIFIED FUZZY LINEAR DISCRIMINANT ANALYSIS

BACKGROUND OF THE INVENTION

1. Field of the Invention

The present invention relates generally to biometrics and computer applications for facial recognition, and particularly to a method of performing facial recognition using genetically modified fuzzy linear discriminant analysis, including modification of the Fuzzy Fisherface classification scheme.

2. Description of the Related Art

Facial recognition has recently found many applications and has attracted substantial research efforts from the areas of computer vision, bio-informatics, and machine learning. The techniques used for facial recognition are broadly classified as either appearance-based or geometrical feature-based. The appearance-based techniques use the holistic features of the face image, whereas the geometrical features of the image are utilized in the latter. Some researchers have also adopted a hybrid methodology by applying the appearance-based techniques on the localized regions of the facial image.

Principal Component Analysis (PCA) is one of the most successful techniques used in face image recognition. PCA can be used to perform prediction, redundancy removal, feature extraction, and data compression, etc. PCA essentially reduces the large dimensionality of the data space. The projection of the data is in the direction of the maximum variance of the data used to find the features. However, this subspace is not necessarily optimal in terms of face classification. Large 1-D vectors of pixels are constructed from 2-D facial images, by concatenating the columns and are then projected onto the eigenvectors of the covariance matrix of the training image vectors. If there are N (the number of images) vectors of size M (rows by columns of an image), then the mean vector of all of the images is given by:

$$m = \frac{1}{N}\sum_{i=1}^{N} x_i. \qquad (1)$$

In PCA, the image vectors are first mean-centered. The set of T orthonormal vectors $w_i$'s is sought, forming the projection matrix W of order (M×T), and the feature vectors are then given by the following linear transformation:

$$y_k = W^T x_k \qquad (2)$$

PCA relies on maximizing the total scatter of the training vectors. The total scatter matrix $S_T$ is given by:

$$S_T = \sum_{k=1}^{N} (x_k - m)(x_k - m)^T. \qquad (3)$$

The scatter of the transformed feature vectors is given by $W^T S_T W$. The projection matrix $W_{PCA}$ satisfies the following:

$$W_{PCA} = \arg_W{}^{max} |W^T S_T W|. \qquad (4)$$

It can be shown from linear algebra that the $w_i$ are the eigenvectors of the covariance matrix $C = P^T P$, where P is a matrix composed of the mean centered images $m_i$ as the column vectors placed side by side. Since N image vectors are summed up, the rank of the covariance matrix cannot exceed (N−1), since the vectors are mean subtracted.

The non-zero eigenvalues of the covariance matrix have corresponding orthonormal eigenvectors. The eigenvector associated with the largest eigenvalue is one that reflects the greatest variance in the image. The eigenvalues decrease very rapidly: Roughly 90% of the total variance is contained in the first 5% to 10% of the dimensions, as shown in FIG. 2.

FIG. 2 shows only the first one hundred eigenvectors used for projection, but it is clear that projection using only the first fifteen eigenvectors of the covariance matrix results in above 90% recognition accuracy. Thus, image vectors are projected onto a subspace formed by the most significant eigenvectors (i.e., the principal components) of the covariance matrix. When a test image is projected onto the N-dimensional subspace, it is classified as the class of the vector that minimizes the Euclidean distance with it.

Linear Discriminant Analysis (LDA) looks for the projection matrix that provides the best discrimination among the different classes. LDA tries to achieve this by finding a subspace in which the projected vectors of the different classes are maximally separated. The between-class scatter matrix $S_B$ and the within-class scatter matrix $S_W$ are defined as:

$$S_B = \sum_{i=1}^{c} M_i (x_i - m) \cdot (x_i - m)^T \qquad (5)$$

$$S_W = \sum_{i=1}^{c} \sum_{x_k \in X_i} M_i (x_i - m_i) \cdot (x_i - m)^T, \qquad (6)$$

where $M_i$ is the number of training vectors in the i-th class, c is the number of distinct classes, $m_i$ is the mean of all the vectors belonging to the i-th class, and $X_i$ represents the set of samples belonging to the i-th class, where $x_k$ is the k-th image of that class.

$S_W$ represents the scatter of the features around the mean of each class, and $S_B$ represents the scatter of features around the overall mean for all the classes. In Fisher's LDA, the aim is to maximize $S_B$ while minimizing $S_W$, which translates to maximize the ratio between their determinants $$\frac{\det |S_B|}{\det |S_W|}:$$

$$W_{LDA} = \arg\max_W \frac{|W^T S_B W|}{|W^T S_W W|}. \qquad (7)$$

This ratio is maximized when the column vectors of the projection matrix $W_{LDA}$ are the eigenvectors of $S_W^{-1} S_B$. In order to avoid $S_W$ from becoming singular, PCA is used as a preprocessing step. Thus, the final transformation is given by the following matrix:

$$W^T = W_{LDA}{}^T \cdot W_{PCA}{}^T. \qquad (8)$$

LDA produces well-separated classes in a low-dimensional subspace, even under severe variations in lighting and facial expressions.

In the Fuzzy Fisherface LDA (FLDA), the basic LDA is modified. The modification is the introduction of fuzziness into the "belong-ness" of every projected vector to the classes. In the conventional approach, every vector is assumed to have a crisp membership in the class to which it belongs. However, this does not take into account the resemblance of images belonging to different classes, which occurs under varying conditions. In FLDA, a vector is assigned the membership grades for every class based upon the class label of its k nearest neighbors. This fuzzy k-nearest neighbor algorithm is used to calculate the membership grades of all the vectors. In this manner, the inter-class image resemblance is accounted for. The fuzzy C-class partitioning of the vectors defines the degrees of membership of each vector to all the classes.

In the following, $\mu_{ij}$ represents the membership grade of the j-th vector in the i-th class. The membership functions satisfy the two obvious conditions:

$$\sum_{i=1}^{C} \mu_{ij} = 1 \quad (9)$$

$$0 < \sum_{j=1}^{N} \mu_{ij} < N. \quad (10)$$

During the training phase, the class labels of the k vectors located in the closest neighborhood of each vector is collected. Then, the membership grade of the j-th vector to i-th class is calculated using the expression as:

$$\mu_{ij} = \begin{cases} 0.51 + 0.49\left(\frac{n_{ij}}{k}\right) \\ \text{if } i \text{ is the same as the label of the } j\text{-th pattern} \\ 0.49\left(\frac{n_{ij}}{k}\right) \text{ otherwise} \end{cases} \quad (11)$$

where $n_{ij}$ stands for the number of the neighbors of the j-th vector that belong to the i-th class. The membership allocation formula refines the membership grades of the labeled vectors, and the dominant membership has not been affected. These modified membership grades are used in the computations of the statistical properties of the patterns, such as the mean value and scatter covariance matrices $S_B$ and $S_W$:

$$\overline{m}_i = \frac{\sum_{j=1}^{N} \mu_{ij}^p x_j}{\sum_{j=1}^{N} \mu_{ij}^p} \quad (12)$$

$$FS_B = \sum_{i=1}^{C} \sum_{j=1}^{N} \mu_{ij}^p (\overline{m}_i - m) \cdot (\overline{m}_i - m)^T \quad (13)$$

$$FS_W = \sum_{i=1}^{C} \sum_{x_k \in X_i} \mu_{ij}^p (x_i - \overline{m}_i) \cdot (x_i - \overline{m}_i)^T \quad (14)$$

where i=1, 2, ..., c and p, a fuzzy modifier, is a constant that controls the influence of the fuzzy membership degree.

Although the Fuzzy Fisherface LDA modification results in improved facial recognition, there is still a need for further improvement in computer applications for facial recognition. Thus, a method of performing facial recognition using genetically modified fuzzy linear discriminant analysis solving the aforementioned problems is desired.

SUMMARY OF THE INVENTION

In conventional facial recognition methods, the relationship of each face to a particular class is assumed to be crisp. The Fuzzy Fisherface method introduces a gradual level of assignment of each face pattern to a class, using a membership grading based upon the K-Nearest Neighbor (KNN) algorithm. In the present method, the Fuzzy Fisherface Linear Discriminant Analysis method is modified by incorporating the membership grade of each face pattern into the calculation of the between-class and with-in class scatter matrices in a process referred to herein as "Complete Fuzzy LDA" (CFLDA).

Both the Fuzzy Fisherface and CFLDA methods utilize the Fuzzy-KNN algorithm. The present method further improves the assignment of class membership by improving the parameters of the membership functions. A genetic algorithm is used to optimize these parameters by searching the parameter space. Further, the genetic algorithm is used to find the optimal number of nearest neighbors to be considered during the training phase.

The present method of performing facial recognition using a genetic algorithm-modified fuzzy linear discriminant analysis can be summarized by the following set of steps: (a) establishing a set of N test face images, where N is a non-zero, positive integer; (b) establishing a set of N training face images; (c) calculating a mean vector of all test face images as $$m' = \frac{1}{N}\sum_{i=1}^{N} x'_i,$$

where $x'_i$ represents an i-th test face image vector having a size M', where i is an integer; (d) calculating a mean vector of all training face images as $$m = \frac{1}{N}\sum_{i=1}^{N} x_i,$$

where $x_i$ represents an i-th training face image vector having a size M; and (e) calculating a total scatter matrix $S_T$ as $$S_T = \sum_{k=1}^{N} (x_k - m)(x_k - m)^T,$$

where k is an integer.

The method proceeds further by: (f) calculating a set of orthonormal training image vectors $w_i$, wherein the set of orthonormal vectors $w_i$ are eigenvectors of a covariance matrix $C = P^T P$, where P is a matrix composed of mean centered images $m_i$ as column vectors, placed side by side; (g) forming a projection matrix W of order (M×T) from the set of orthonormal training image vectors $w_i$, where T represents the total number of orthonormal training image vectors $w_i$; (h) calculating a first projection matrix $W_{PCA}$ as $W_{PCA} = \arg_W{}^{max} |W^T S_T W|$; and (i) calculating a membership grade of a j-th training image vector in the i-th class $\mu_{ij}$ as $$\mu_{ij} = \alpha + \beta\left(\frac{n_{ij}}{k}\right)$$

if i is the same as a label of the j-th pattern, and as $$\mu_{ij} = \beta\left(\frac{n_{ij}}{k}\right)$$

if i is not the same as the label of the j-th pattern, where $n_{ij}$ represents a number of neighbors of the j-th vector that belong to the i-th class, k is an integer representing a number of nearest neighbors of the j-th training image vector, and wherein $\beta=1-\alpha$, and $\alpha$ represents an offset in membership grading assigned to a training vector in its class.

The method continues by: (j) optimizing a using a genetic algorithm in order to minimize recognition error; (k) calculating a mean of all training vectors belonging to the l-th class as $$\overline{m}_l = \frac{\sum_{j=1}^{N} \mu_{ij}^p x_j}{\sum_{j=1}^{N} \mu_{ij}^p},$$

where l is an integer; (l) calculating a between-class scatter matrix $S_B$ and a within-class scatter matrix $S_W$ as $$S_B = \sum_{i=1}^{C}\sum_{j=1}^{N} \mu_{ij}^p (\overline{m}_l - m)\cdot(\overline{m}_l - m)^T$$

and $$S_W = \sum_{i=1}^{C}\sum_{x_k \in X_i} \mu_{ij}^p (x_i - \overline{m}_l)\cdot(x_i - \overline{m}_l)^T,$$

respectively, where $X_i$ represents a set of training samples belonging to the i-th class, $x_k$ is the k-th image of the i-th class, and i=1, 2, ..., c, where p is a fuzzy modifier which is a constant controlling influence of fuzzy membership degree; (m) calculating a second projection matrix $W_{LDA}$ as $$W_{LDA} = \underset{W}{\operatorname{argmax}} \frac{|W^T S_B W|}{|W^T S_W W|};$$

(n) calculating a total transformation matrix $W^T$ as $W^T = W_{LDA}{}^T \cdot_{PCA}{}^T$; (o) calculating a set of test feature vectors $y'_k$ as $y'_k = W^T x'_k$; (p) calculating a set of training feature vectors $y_k$ as $y_k = W^T x_k$; (q) calculating a Euclidean distance between each of the test feature vectors $y'_k$ and each of the training feature vectors $y_k$; and (r) calculating a classification based upon the calculated Euclidean distances.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
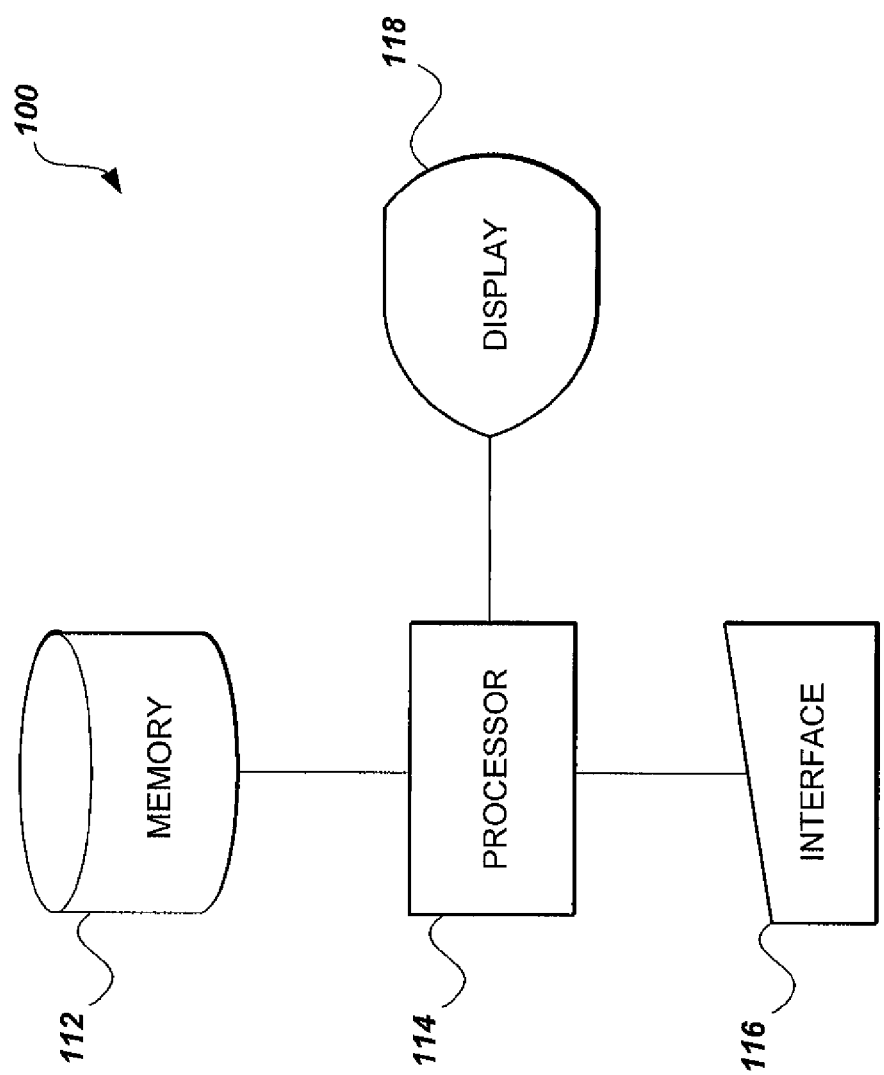
FIG. 1 is a block diagram of an exemplary system for performing a method of performing facial recognition using genetically modified fuzzy linear discriminant analysis according to the present invention.
Figure 2:
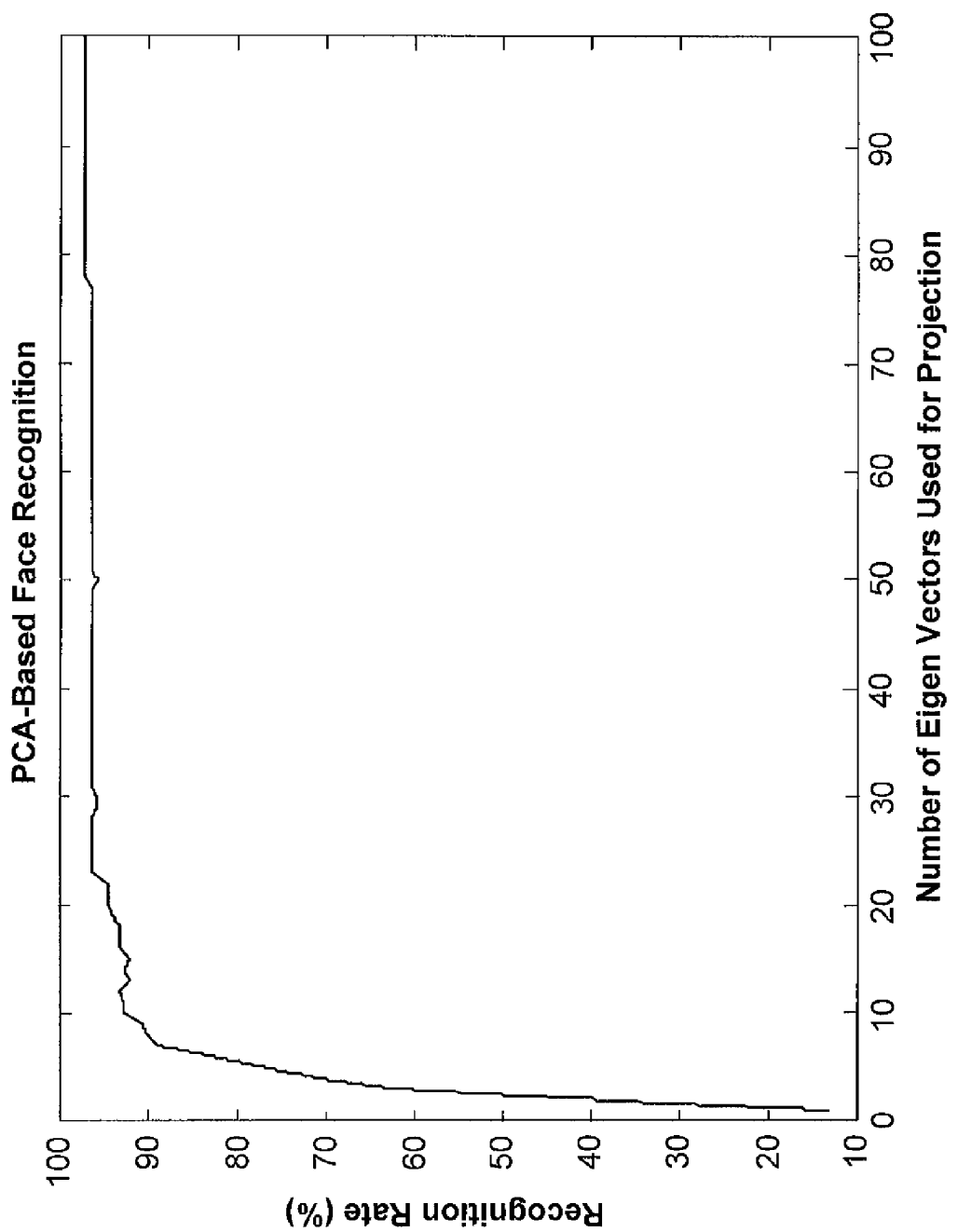
FIG. 2 is a graph illustrating performance of PCA-based (Principal Component Analysis-based) facial recognition.

The present method of performing facial recognition using a genetic algorithm-modified fuzzy linear discriminant analysis modifies the LDA method and the Fuzzy Fisherface methods, described above, by calculating the membership function of the training vectors, which was used above in equation (12) to calculate the mean, and which was also used in equations (13) and (14) to calculate the scatter matrices, by using equation (11). Since the grade of membership is calculated in the Fuzzy Fisherface method by weighting the contribution of the k-nearest neighbor vectors, the dominant membership is assigned an offset of 0.51, ensuring the dominant membership remains intact.

It should be noted that it is possible that certain vectors belonging to different classes are close to each other, even after projection, because the higher order dependencies are not addressed by the PCA and LDA methods. The LDA relies on the assumption that the face image classes are homoscedastic; i.e., the class covariance matrices are presumed to be identical. However, in the domain of face recognition, one never knows in advance the underlying distributions for the different classes. Therefore, the value of the offset in assigning the membership grades will have an effect on the performance of the classification and, thus, on accuracy and recognition rate. The present method improves the parameters of the membership function by setting up the problem for optimizing the parameters $\alpha$ and $\beta$, as follows:

$$\mu_{ij} = \begin{cases} \alpha + \beta\left(\frac{n_{ij}}{k}\right) \\ \text{if } i \text{ is the same as the label of the } j\text{-}th \text{ pattern} \\ \beta\left(\frac{n_{ij}}{k}\right) \text{ otherwise} \end{cases} \quad (15)$$

where $\beta=1-\alpha$, and value of $\alpha$ is the offset in the membership grading assigned to a training vector in its class. Thus, the problem is set up to optimize the value of $\alpha$ using a genetic algorithm with the objective of minimizing the recognition error. In this setup, the optimal value of $\alpha$ is searched in the search space bounded between 0 and 1. The initial search, however, is performed in the vicinity of 0.51 because this value has been found experimentally to provide good results.

Further, the number of k-nearest neighbors taken into consideration while calculating the membership grades (i.e., the value of k in equation (15)) also has an impact on the optimal value of $\alpha$. Therefore, the best value of k is also searched using the genetic algorithm, together with $\alpha$. These values of $\alpha$ and k are used to calculate the membership grades of the training vectors and to calculate the mean and scatter matrices using equations (12), (13) and (14), respectively.

The mean and scatter matrices are used to find the optimized projection matrix W, as in equation (8) above. When an unknown test image vector is to be recognized, it is first projected using the projection matrix W and is assigned the membership grade of the training vector nearest to it in the projected subspace. This is referred to as "binary classification". Thus, the unknown image is classified as belonging to the class in which its nearest neighbor has the highest membership degree.

Figure 3:
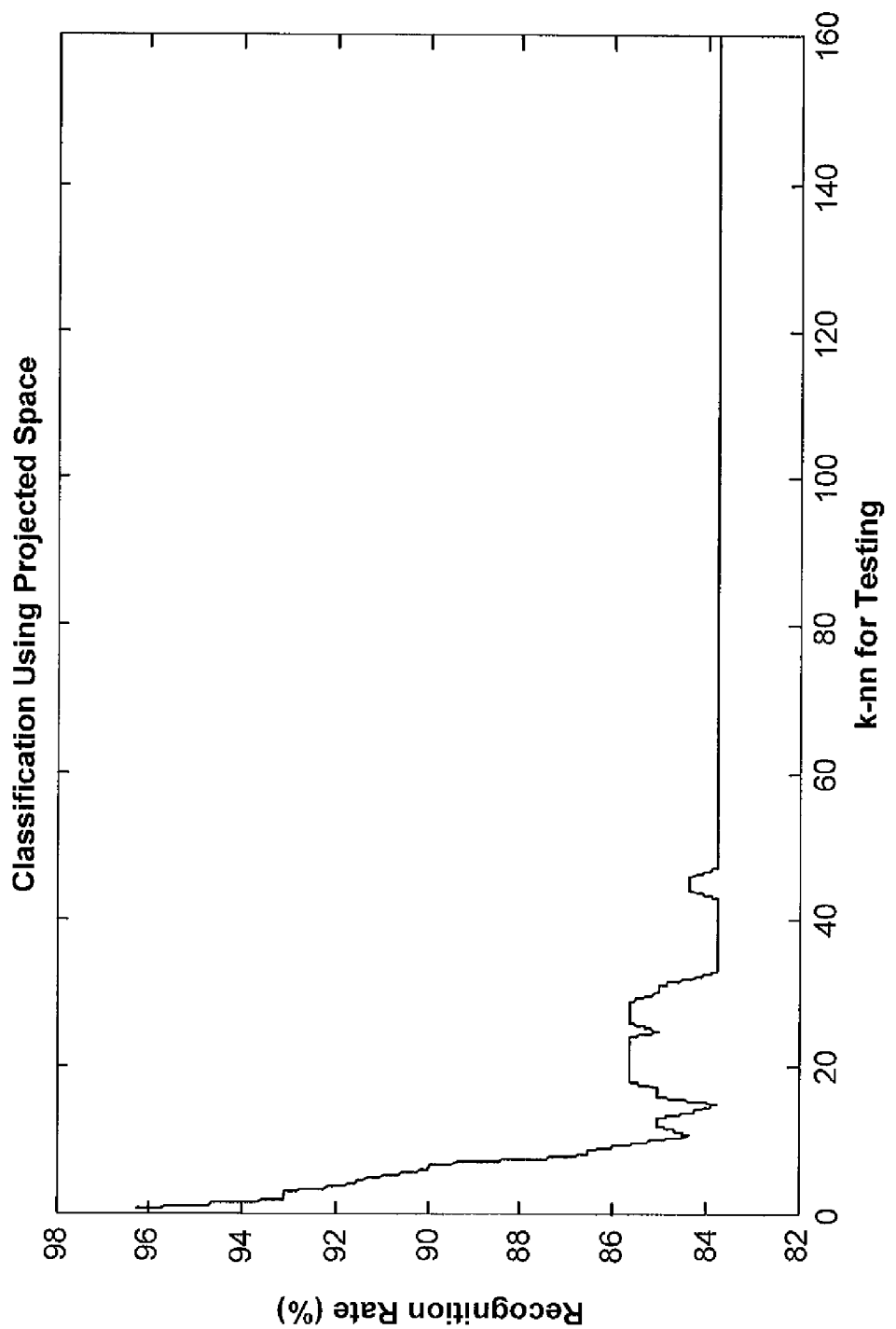
FIG. 3 is a graph illustrating the effect of k in k-nn classification of test vectors in the present method of performing facial recognition using genetically modified fuzzy linear discriminant analysis.

Experimentally, in another classification, the membership grade of the test vector was also assigned from the k-nearest training vectors neighbors using equation (11). Binary classification (i.e., k=1) was then used for the class assignment of the test image vectors in all experiments, as it provided the least recognition error, as shown in FIG. 3.

The present method of performing facial recognition using a genetic algorithm-modified fuzzy linear discriminant analysis can be summarized by the following set of steps: (a) establishing a set of N test face images, where N is a non-zero, positive integer; (b) establishing a set of N training face images; (c) calculating a mean vector of all test face images as $$m' = \frac{1}{N}\sum_{i=1}^{N} x'_i,$$

where $x'_i$ represents an i-th test face image vector having a size M', where i is an integer; (d) calculating a mean vector of all training face images as $$m = \frac{1}{N}\sum_{i=1}^{N} x_i,$$

where $x_i$ represents an i-th training face image vector having a size M; and (e) calculating a total scatter matrix $S_T$ as $$S_T = \sum_{k=1}^{N} (x_k - m)(x_k - m)^T,$$

where k is an integer.

The method proceeds further by: (f) calculating a set of orthonormal vectors $w_i$, wherein the set of test image orthonormal vectors $w_i$ are eigenvectors of a covariance matrix $C=P^T P$, where P is a matrix composed of mean centered images $m_i$ as column vectors, placed side by side; (g) forming a projection matrix W of order (M×T) from the set of orthonormal training image vectors $w_i$, where T represents the total number of orthonormal training image vectors $w_i$; (h) calculating a first projection matrix $W_{PCA}$ as $W_{PCA}=\arg_W{}^{max}|W^T S_T W|$; and (i) calculating a membership grade of a j-th training image vector in the i-th class $\mu_{ij}$ as $$\mu_{ij} = \alpha + \beta\left(\frac{n_{ij}}{k}\right)$$

if i is the same as a label of the j-th pattern, and as $$\mu_{ij} = \beta\left(\frac{n_{ij}}{k}\right)$$

if i is not the same as the label of the j-th pattern, where $n_{ij}$ represents a number of neighbors of the j-th vector that belong to the i-th class, k is an integer representing a number of nearest neighbors of the j-th training image vector, and wherein $\beta=1-\alpha$, and $\alpha$ represents an offset in membership grading assigned to a training vector in its class.

The method continues by: (j) optimizing $\alpha$ using a genetic algorithm in order to minimize recognition error; (k) calculating a mean of all training vectors belonging to the l-th class as $$\overline{m}_l = \frac{\sum_{j=1}^{N} \mu_{ij}^P x_j}{\sum_{j=1}^{N} \mu_{ij}^P},$$

where l is an integer; (l) calculating a between-class scatter matrix $S_B$ and a within-class scatter matrix $S_W$ as $$S_B = \sum_{i=1}^{C}\sum_{j=1}^{N} \mu_{ij}^P (\overline{m}_l - m)\cdot(\overline{m}_l - m)^T$$

and $$S_W = \sum_{i=1}^{C} \sum_{x_k \in X_i} \mu_{ij}^p (x_i - \overline{m}_l) \cdot (x_i - \overline{m}_l)^T,$$

respectively, where $X_i$ represents a set of training samples belonging to the i-th class, $x_k$ is the k-th image of the i-th class, and i=1, 2, . . . , c, where p is a fuzzy modifier which is a constant controlling influence of fuzzy membership degree; (m) calculating a second projection matrix $W_{LDA}$ as $$W_{LDA} = \underset{W}{\operatorname{argmax}} \frac{|W^T S_B W|}{|W^T S_W W|};$$

(n) calculating a total transformation matrix $W^T$ as $W^T = W_{LDA}{}^T \cdot {}_{PCA}{}^T$; (o) calculating a set of test feature vectors $y'_k$ as $y'_k = W^T x'_k$; (p) calculating a set of training feature vectors $y_k$ as $y_k = W^T x_k$; (q) calculating a Euclidean distance between each of the test feature vectors $y'_k$ and each of the training feature vectors $y_k$; and (r) calculating a classification based upon the calculated Euclidean distances.

The experimental comparisons described below were carried out in MATLAB using the AT&T Database of Faces, formerly known as the Olivetti Research Laboratory (ORL) face database. The sample set for experimental comparisons included ten different images of forty different people. In some cases, the images were taken at different times, with slight variations in light, and variations in facial expressions (such as open or closed eyes, smiling vs. non-smiling images, and varying facial features, such as glasses vs. no glasses).

Figure 4:
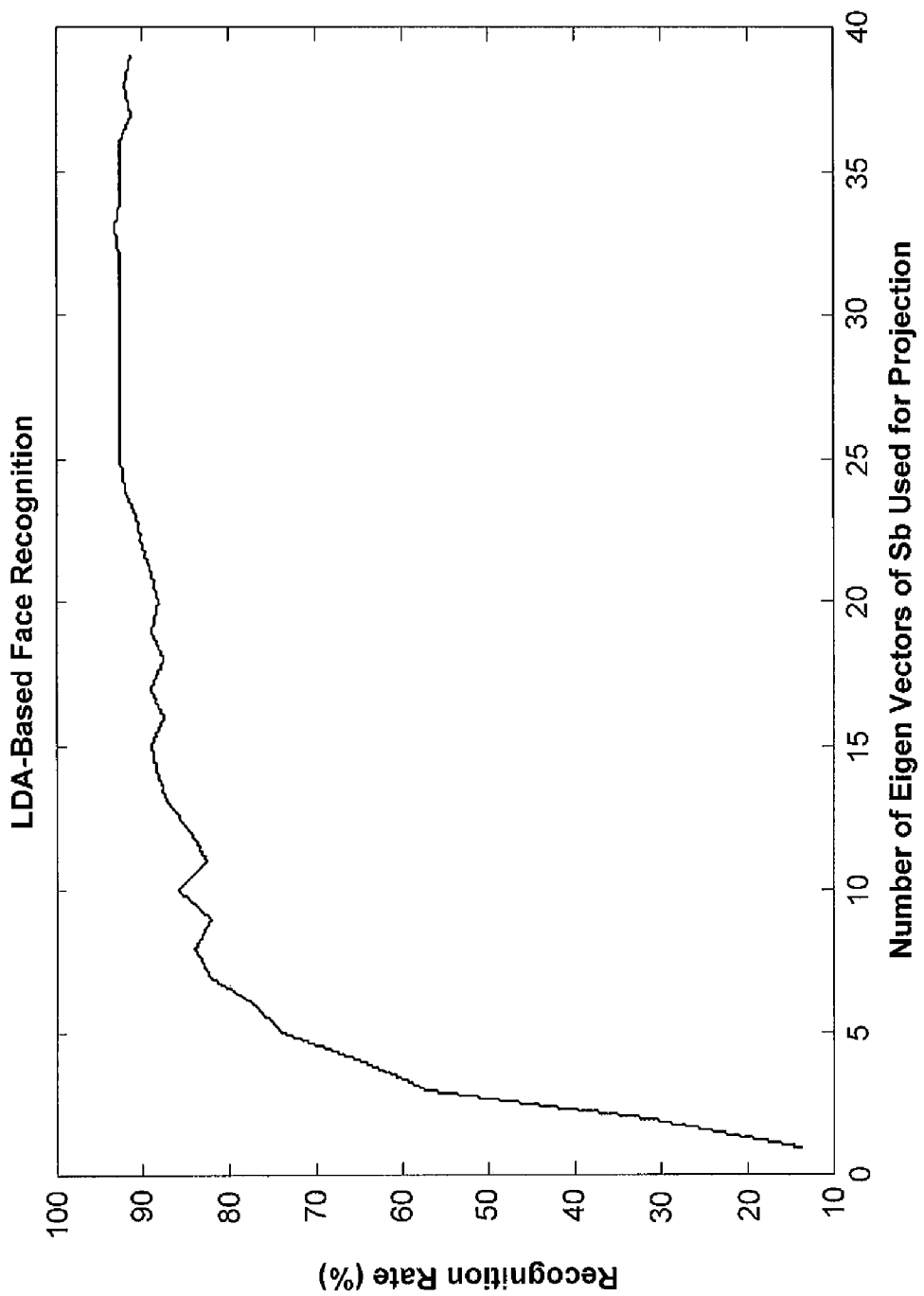
FIG. 4 is a graph illustrating performance of LDA-based (Linear Discriminant Analysis-based) facial recognition.

During the training phase, six images of each of the forty individuals were used, totaling 240 images, and during the testing phase, four images of each of the forty persons, totaling 160 images, were used. The LDA method was first applied on the database and it performed better with a maximum number of eigenvectors of the $S_B$ matrix. In the case of forty classes, there were a maximum of 39 eigenvectors used for projection, as shown in FIG. 4.

Figure 5:
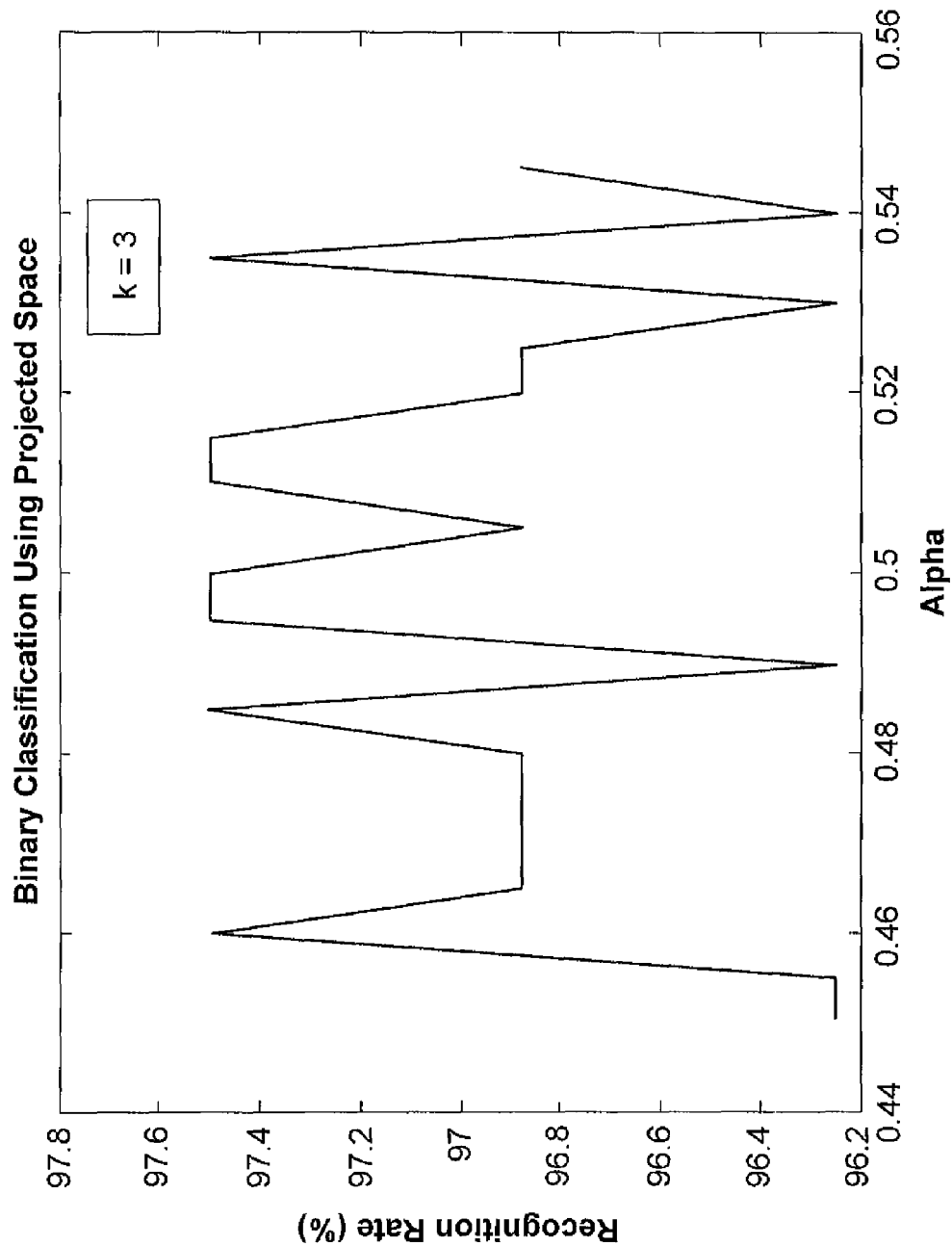
FIG. 5 is a graph illustrating the effect of a on facial recognition in the method of performing facial recognition using genetically modified fuzzy linear discriminant analysis according to the present invention.
Figure 6:
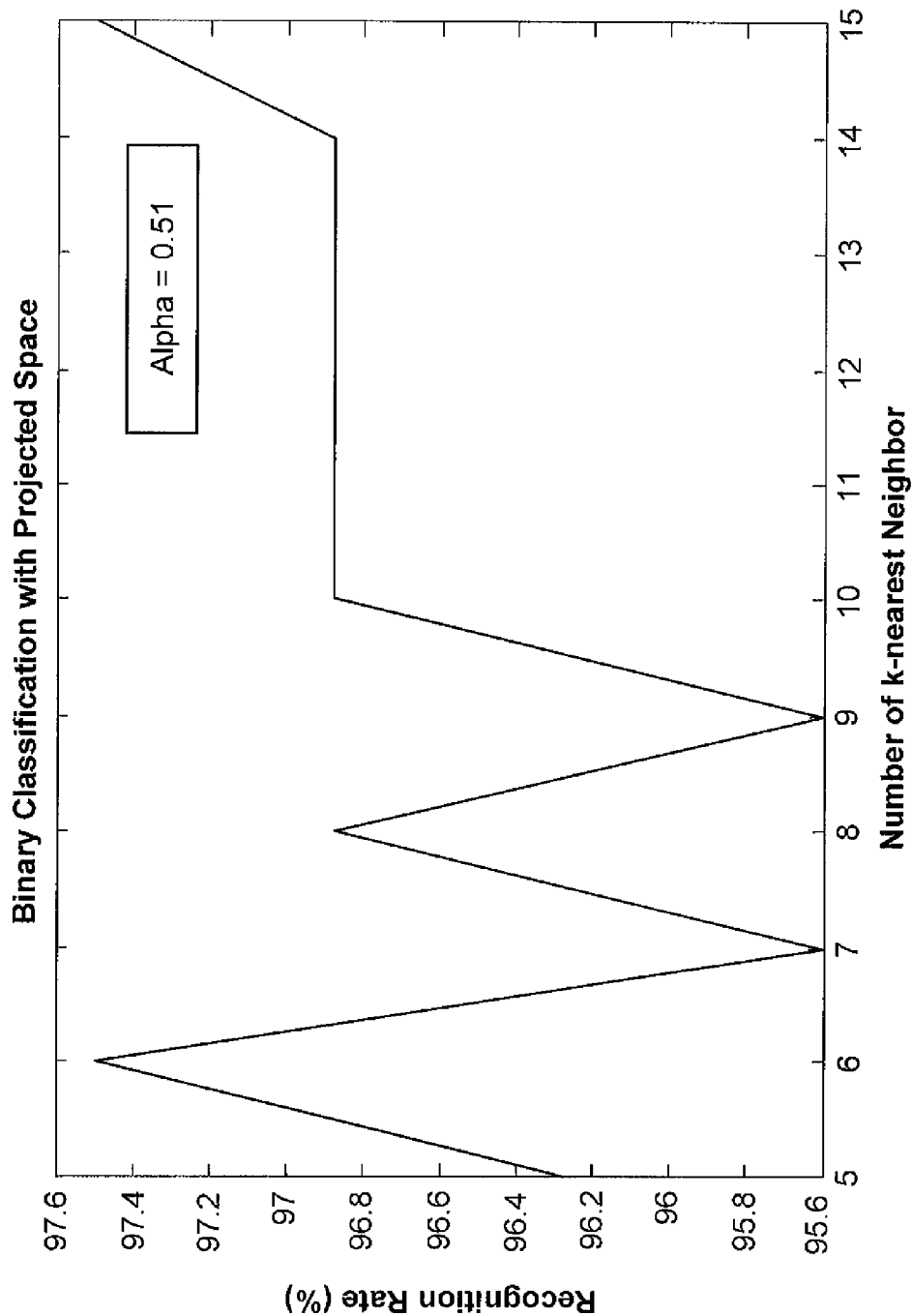
FIG. 6 is a graph illustrating the effect of k on facial recognition in the method of performing facial recognition using genetically modified fuzzy linear discriminant analysis according to the present invention, for a value of $\alpha=0.51$.

The experiment was then performed for the Fuzzy Fisherface method with the values of α taken in the range of 0.45 to 0.55, with a step size of 0.005, for a fixed number of k=3; i.e., three nearest neighbors were considered while calculating the membership grades of the vectors during training. The result, as shown in FIG. 5, showed that the recognition rate varies with the values of α. This provided a rationale to search for the best value of α which gives the highest recognition rate. The experiment was also performed for a fixed value of α=0.51, and varying k from 5 to 15. The result showed that the recognition rate also varies with the different number of k-nearest neighbors, as shown in FIG. 6.

Figure 7:
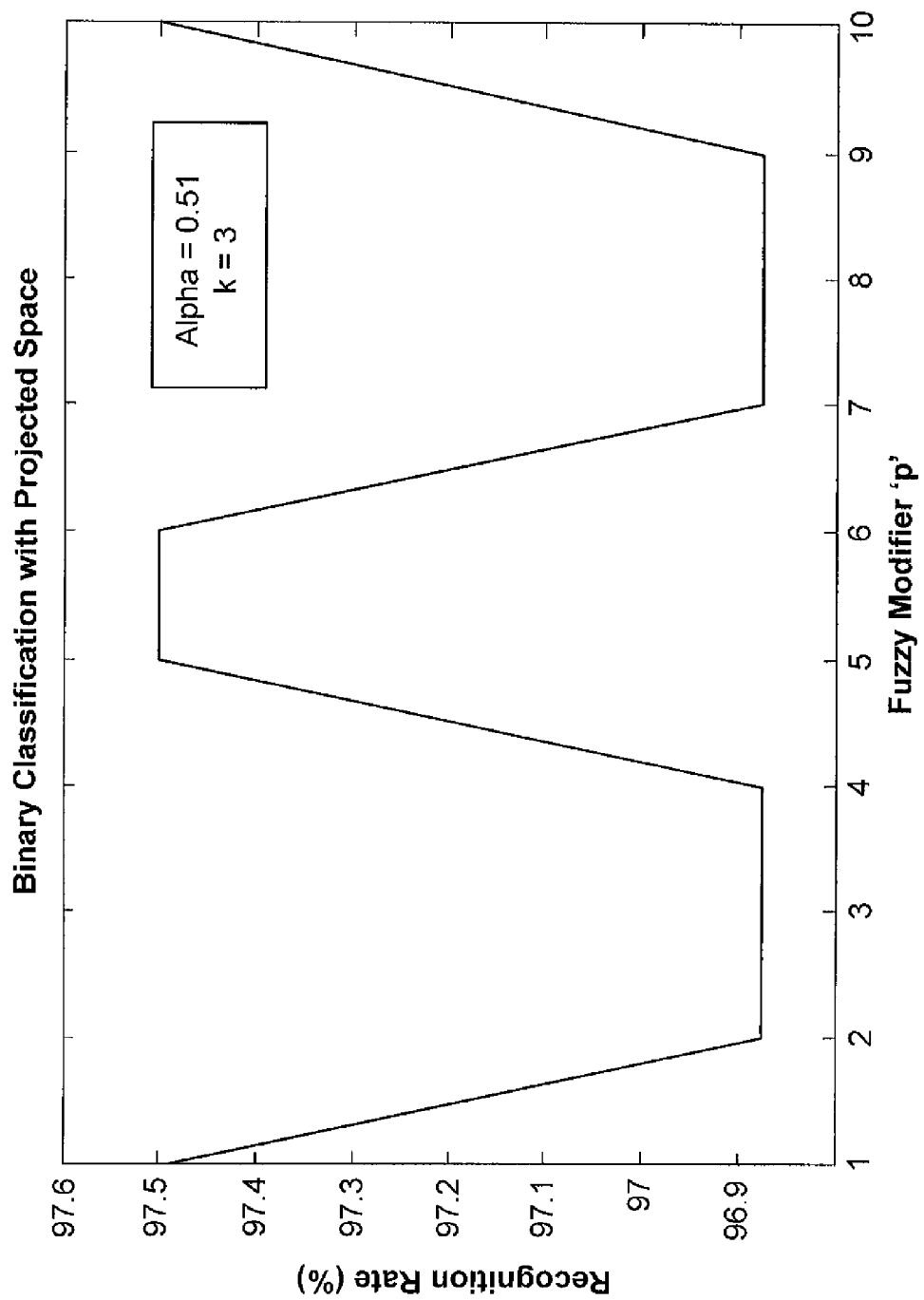
FIG. 7 is a graph illustrating the effect of p on facial recognition in the method of performing facial recognition using genetically modified fuzzy linear discriminant analysis according to the present invention, for values of $\alpha=0.51$ and k=3.

Further, the fuzzy modifier parameter p, which controls the influence of the fuzzy membership degree in equations (12), (13), and (14), also showed some impact on the recognition rate. In the above experiments, the value of p was fixed at 1. FIG. 7 shows the effect of the values of p in the range from 1 to 10 on the recognition rate, where α=0.51 and k=3.

The above findings encouraged the use of a genetic algorithm (GA) to search for the optimal values of α, k and p. The error rate in the recognition is the fitness function to be minimized by the genetic algorithm. The population size of the individuals for the genetic algorithm was selected as 50, with the population type as double and the number of maximum generations was set to 100. However, in most cases, the results converged before the 100$^{th}$ generation. For every new generation, the population individuals were ranked according to the fitness value. The selection was performed using the stochastic uniform function, and the crossovers of the individuals were carried out using the scattered function with 0.8 as the crossover fraction.

Figure 8A:
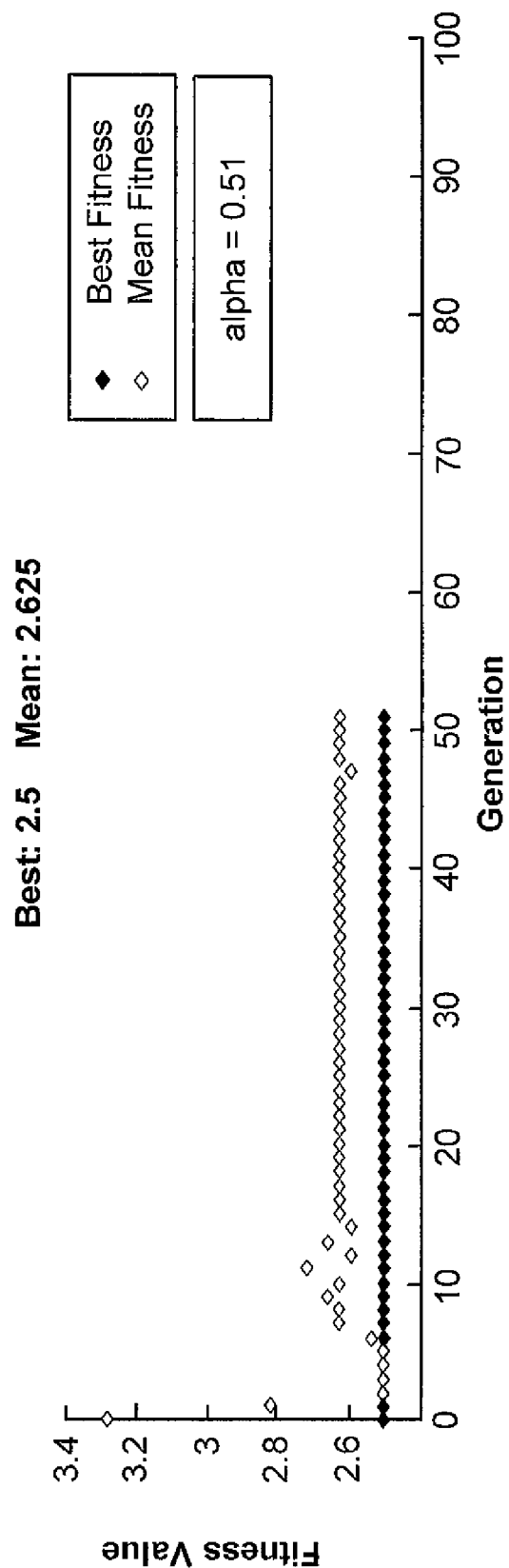
FIG. 8A is a graph illustrating a genetic algorithm-based search of $\alpha$ in the range of [0.4, 0.7] in the present method of performing facial recognition using genetically modified fuzzy linear discriminant analysis.
Figure 8B:
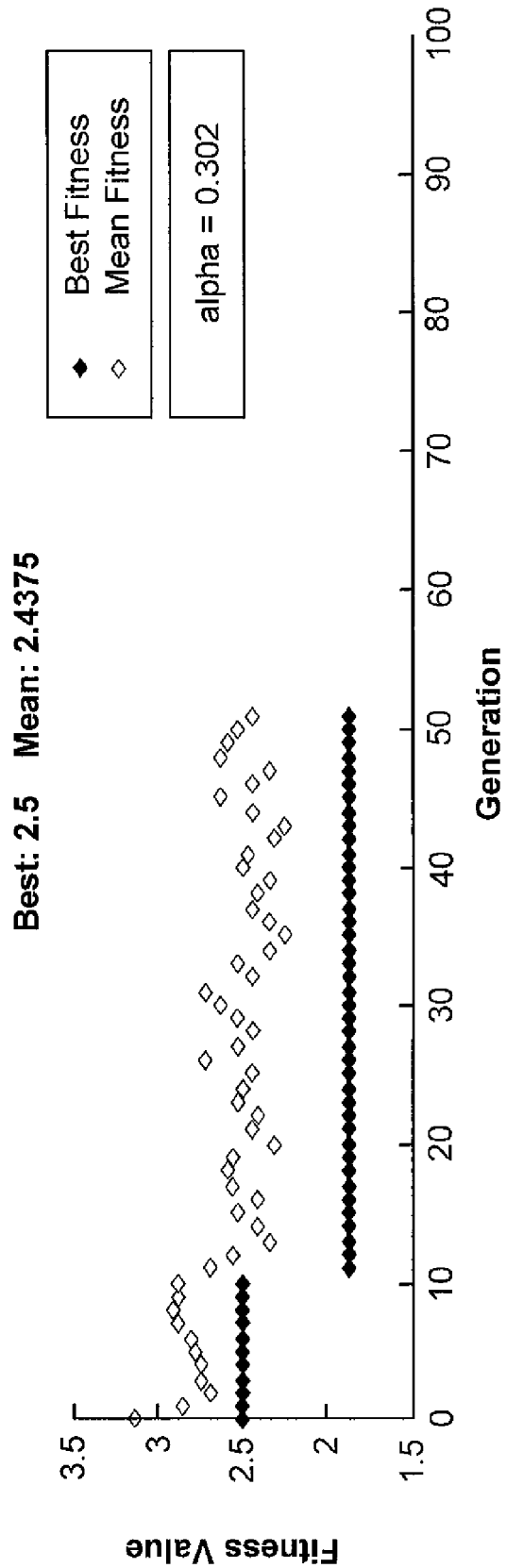
FIG. 8B is a graph illustrating a genetic algorithm-based search of $\alpha$ in the range of [0.1, 1.0] in the present method of performing facial recognition using genetically modified fuzzy linear discriminant analysis.

The genetic algorithm was first used to search for the best value of α, in the range of 0.4 to 0.7 for k=3, and was found to be 0.51, giving 2.5% error in the best case, as shown in FIG. 8A. When the search space was increased from 0.1 to 1.0, the error in the best case was found to decrease to 1.875%, with the value of α=0.302, as shown in FIG. 8B. Since the error rate varied for different values of k and α, as shown in FIGS. 5 and 6, the optimal values of α and k were searched together within the following ranges: 0<α<1 and 1≦k≦160.

Figure 8C:
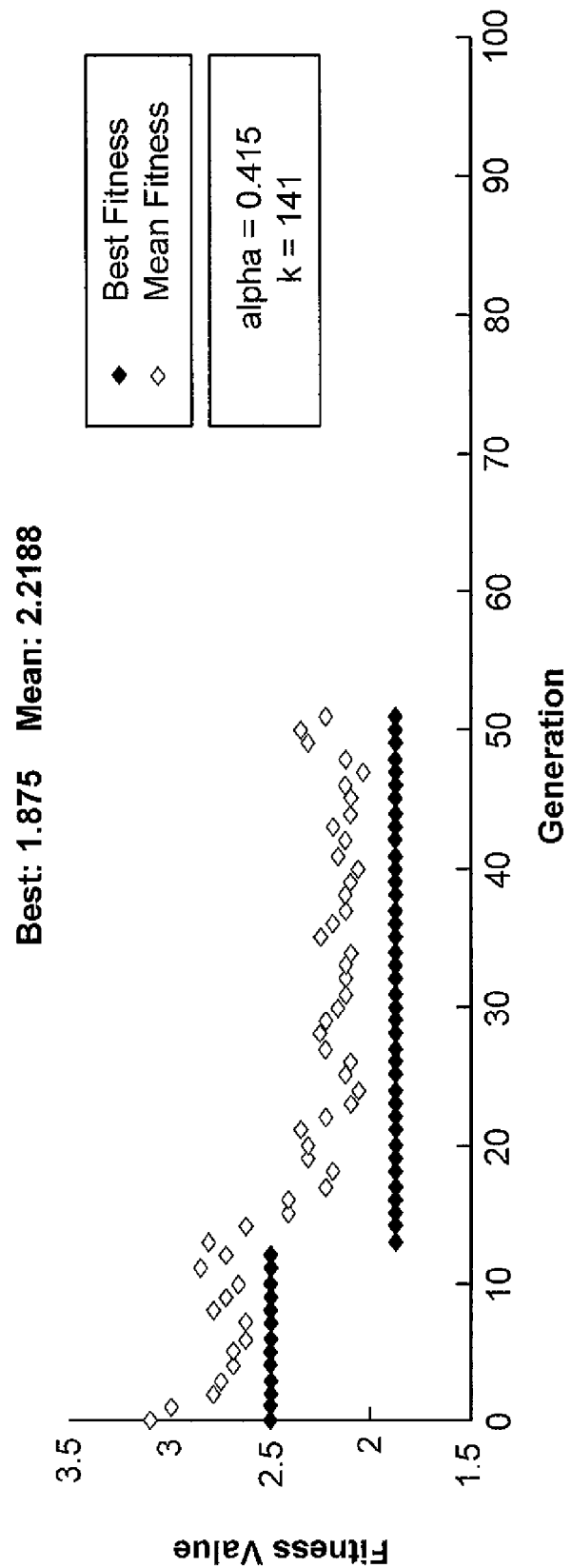
FIG. 8C is a graph illustrating a genetic algorithm-based search of $\alpha$ and k in the present method of performing facial recognition using genetically modified fuzzy linear discriminant analysis.
Figure 8D:
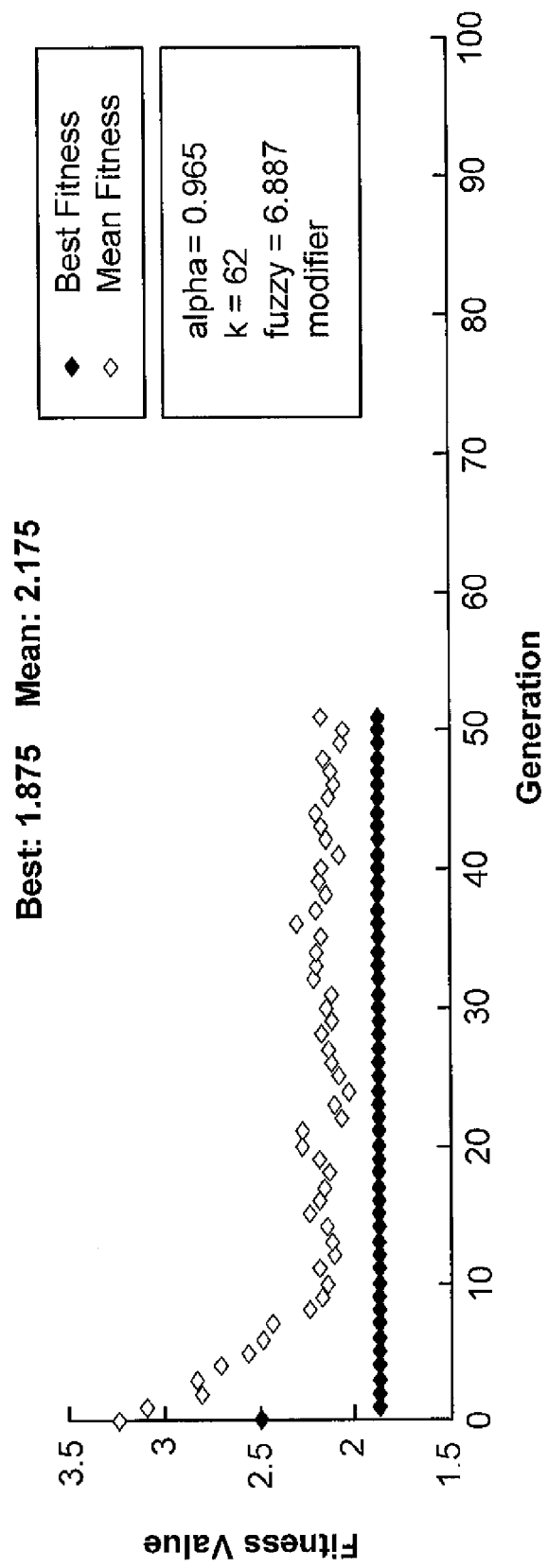
FIG. 8D is a graph illustrating a genetic algorithm-based search of $\alpha$, k and p in the present method of performing facial recognition using genetically modified fuzzy linear discriminant analysis.

The values that gave the lowest error in the recognition were found to be α=0.415 and k=141, as shown in FIG. 8C. Finally, the fuzzy modifier p was also included in the above search, for the range 1≦p≦10. The least error was found with the values of p=6.887, α=0.965 and k=62, as shown in FIG. 8D.

The experiments were performed in order to find the optimal values of α and k-nearest neighbor used to generate the fuzzy membership grade of the vectors during the training phase. These were then used to calculate the projection matrix that resulted in an improved projection and, thus, better recognition accuracy. Fuzzy k-nearest neighbor assignment used to assign the class membership to vectors during training was found to be better than the binary assignment used in classical LDA, whereas binary classification was found to result consistently in better recognition rates as compared to k-nearest neighbor classification for the test vectors.

The values of α and k found by the genetic algorithm varied for different search ranges, but the least (i.e., the best) error rate was found to be 1.875% in a number of scenarios. The improvement that resulted in the present method is due to the optimization in assigning the membership grades. The best membership function parameter for the employed database is searched through GA and, therefore, the recognition improves. The different values of α that result in the same minimum recognition error rate of 1.875% (as shown in FIGS. 8A through 8D) indicates that the error surface has multi-modal minima. The values of α found to be less than 0.5, as shown in FIGS. 8B and 8C, point out that the features of different classes are not completely discriminated by FLDA. This is possible because the method does not take into consideration the higher order dependencies of the image vectors.

Figure 9:
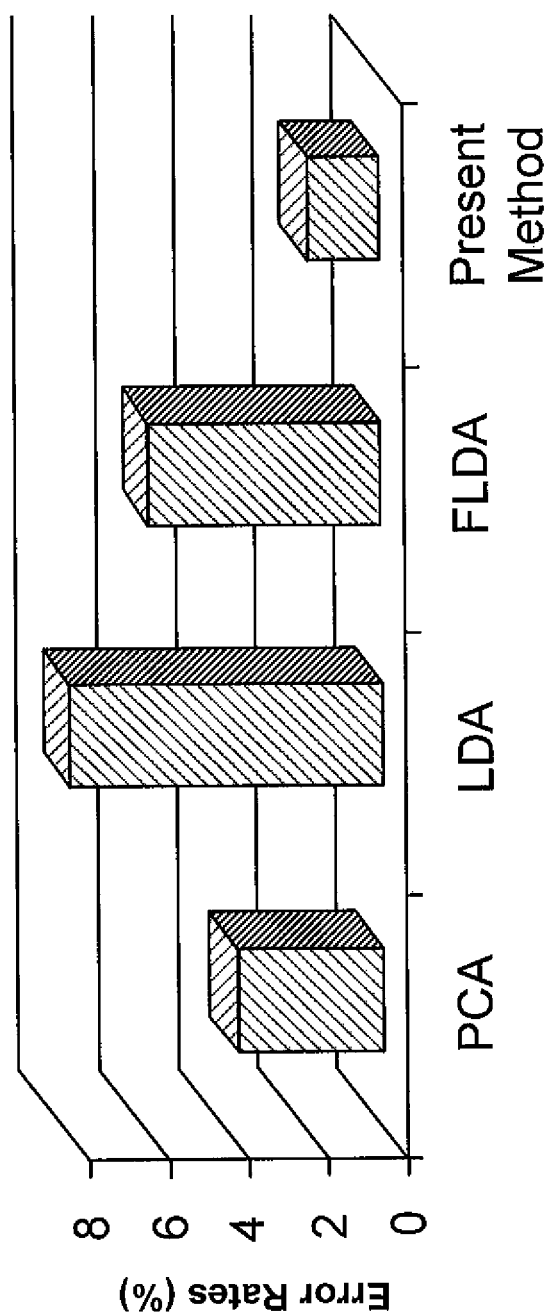
FIG. 9 is a histogram illustrating a comparison of recognition error rates between PCA, LDA and the present method of performing facial recognition using genetically modified fuzzy linear discriminant analysis.

The computational complexity of the present method is similar to that of the Fuzzy Fisherface (FLDA) method, but more time is consumed by the genetic algorithm to perform the search. This can be reduced by reducing the number of generations used in GA because the fitness function converges in fewer generations, as is evident from FIGS. 8A-8D. The best (i.e., the least) error rates obtained by the PCA, LDA, FLDA and the present method are compared in FIG. 9.

Figure 10:
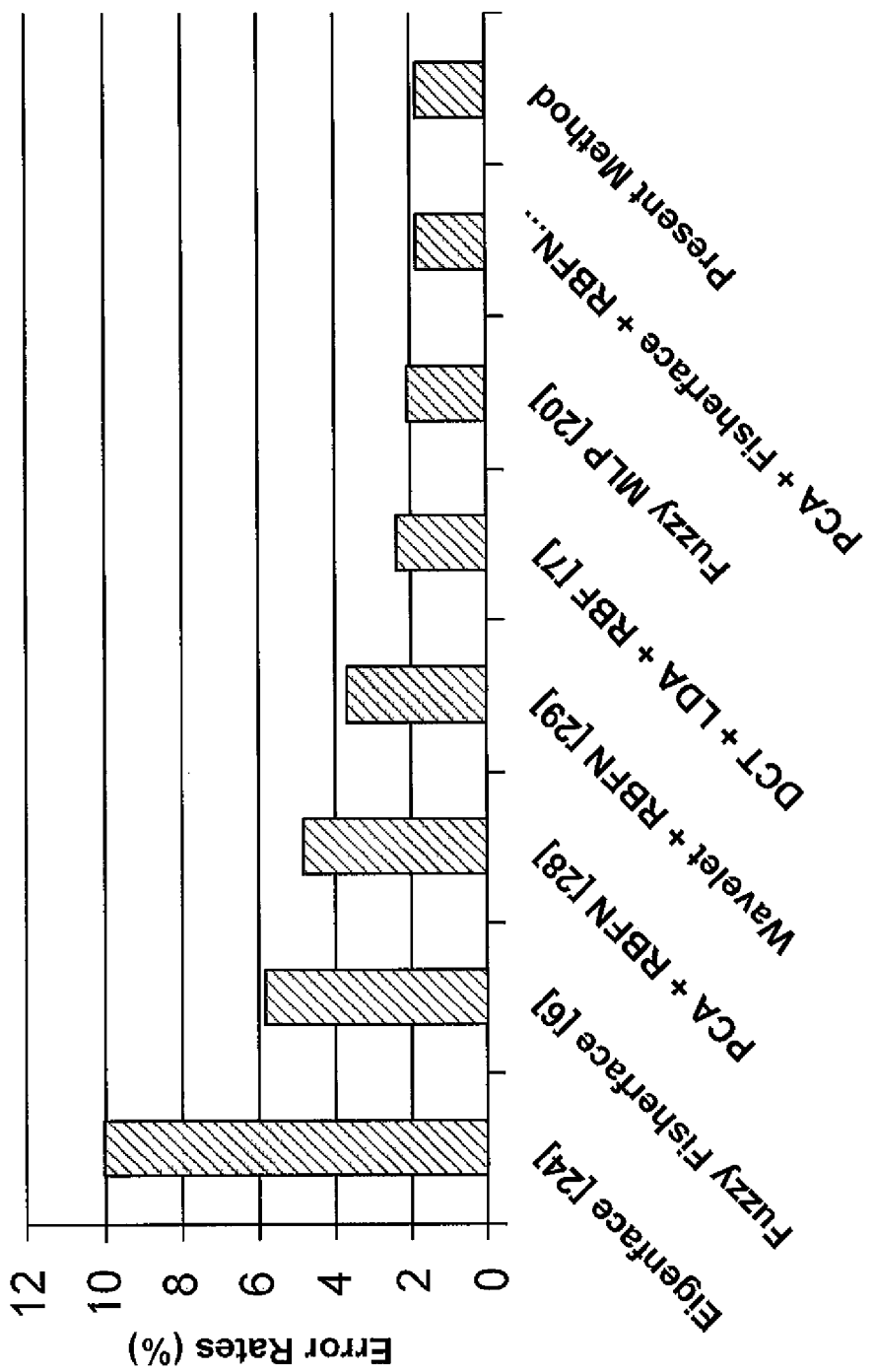
FIG. 10 is a chart illustrating error rates for conventional facial recognition techniques as compared to the present method of performing facial recognition using genetically modified fuzzy linear discriminant analysis.

The bar graph of FIG. 10 shows the comparison with some of the error rates reported in the literature obtained using other methods on the same ORL database. It should be noted that the error rate for the Fuzzy Fisherface (FLDA) method is for a case of similar division of the ORL database as in the present method, i.e., six images per person for training, and four images per person for testing.

It should be understood that the calculations may be performed by any suitable computer system, such as that diagrammatically shown in FIG. 1. Data is entered into the system 100 via any suitable type of user interface 116, and may be stored in memory 112, which may be any suitable type of computer readable and programmable memory. Calculations are performed by a processor 114, which may be any suitable type of computer processor, and may be displayed to the user on display 118, which may be any suitable type of computer display.

The processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A computer-implemented method of performing facial recognition using genetic algorithm-modified fuzzy linear discriminant analysis, comprising the steps of
   a) establishing a set of N test face images, where N is a non-zero, positive integer;
   b) establishing a set of N training face images;
   c) calculating a mean vector of all test face images as $$m' = \frac{1}{N}\sum_{i=1}^{N} x'_i,$$

where $x'_i$ represents an i-th test face image vector having a size M', where i is an integer;
   d) calculating a mean vector of all training face images as $$m = \frac{1}{N}\sum_{i=1}^{N} x_i,$$

where $x_i$ represents an i-th training face image vector having a size M;
   e) calculating a total scatter matrix $S_T$ as $$S_T = \sum_{k=1}^{N}(x_k - m)(x_k - m)^T,$$

where k is an integer;
   f) calculating a set of orthonormal image vectors $w_i$, wherein the set of orthonormal image vectors $w_i$ are eigenvectors of a covariance matrix $C = P^T P$, where P is a matrix composed of mean centered images $m_i$ as column vectors placed side by side;
   g) forming a projection matrix W of order (M×T) from the set of orthonormal image vectors $w_i$, where T represents the total number of orthonormal image vectors $w_i$;
   h) calculating a first projection matrix $W_{PCA}$ as $W_{PCA} = \arg_W^{max}|W^T S_T W|$;
   i) calculating a membership grade of a j-th image vector in the i-th class $\mu_{ij}$ as $$\mu_{ij} = \alpha + \beta\left(\frac{n_{ij}}{k}\right)$$

if i is the same as a label of the j-th pattern, and as $$\mu_{ij} = \beta\left(\frac{n_{ij}}{k}\right)$$

if i is not the same as the label of the j-th pattern, where $n_{ij}$ represents a number of neighbors of the j-th vector that belong to the i-th class, k is an integer representing a number of nearest neighbors of the j-th image vector, and wherein $\beta = 1 - \alpha$, and $\alpha$ represents an offset in membership grading assigned to a vector in its class;
   j) optimizing $\alpha$ using a genetic algorithm in order to minimize recognition error;
   k) calculating a mean of all vectors belonging to the l-th class as $$\overline{m}_l = \frac{\sum_{j=1}^{N}\mu_{ij}^p x_j}{\sum_{j=1}^{N}\mu_{ij}^p},$$

where l is an integer;
   l) calculating a between-class scatter matrix $S_B$ and a within-class scatter matrix $S_W$ as $$S_B = \sum_{i=1}^{C}\sum_{j=1}^{N}\mu_{ij}^p(\overline{m}_l - m)\cdot(\overline{m}_l - m)^T$$

and $$S_W = \sum_{i=1}^{C}\sum_{x_k \in X_i}\mu_{ij}^p(x_i - \overline{m}_l)\cdot(x_i - \overline{m}_l)^T,$$

respectively, where $X_i$ represents a set of samples belonging to the i-th class, $x_k$ is the k-th image of the i-th class, and i=1, 2, . . . , c, where p is a fuzzy modifier, which is a constant controlling influence of fuzzy membership degree;
   m) calculating a second projection matrix $W_{LDA}$ as $$W_{LDA} = \arg\max_W \frac{|W^T S_B W|}{|W^T S_W W|};$$

n) calculating a total transformation matrix $W^T$ as $W^T = W_{LDA}^T \cdot W_{PCA}^T$;

o) calculating a set of test feature vectors $y'_k$ as $y'_k=W^T x'_k$;
p) calculating a set of training feature vectors $y_k$ as $y_k=W^T x_k$;
q) calculating a Euclidean distance between each of the test feature vectors $y'_k$ and each of the training feature vectors $y_k$; and
r) calculating a classification based upon the calculated Euclidean distances.

2. The computer-implemented method of performing facial recognition as recited in claim 1, further comprising the step of optimizing k using the genetic algorithm in order to minimize the recognition error.

3. The computer-implemented method of performing facial recognition as recited in claim 2, further comprising the step of optimizing p using the genetic algorithm in order to minimize the recognition error.

4. The computer-implemented method of performing facial recognition as recited in claim 3, wherein the step of optimizing α and the steps of optimizing k and p using the genetic algorithm are performed together.

5. The computer-implemented method of performing facial recognition as recited in claim 4, wherein the optimal value of α is searched in a search space bounded between 0 and 1.

6. The computer-implemented method of performing facial recognition as recited in claim 5, wherein an initial search for the optimal value of α is centered at a value of 0.51.

7. A system for performing facial recognition using genetic algorithm-modified fuzzy linear discriminant analysis, comprising:
a processor;
computer readable memory coupled to the processor;
a user interface coupled to the processor;
a display coupled to the processor;
software stored in the memory and executable by the processor, the software having:
means for establishing a set of N test face images, where N is a non-zero, positive integer;
means for establishing a set of N training face images;
means for calculating a mean vector of all test face images as $$m' = \frac{1}{N}\sum_{i=1}^{N} x'_i,$$

where $x'_i$, represents an i-th test face image vector having a size M', where i is an integer;
means for calculating a mean vector of all training face images as $$m = \frac{1}{N}\sum_{i=1}^{N} x_i,$$

where $x_i$, represents an i-th training face image vector having a size M;
means for calculating a total scatter matrix $S_T$ as $$S_T = \sum_{k=1}^{N} (x_k - m)(x_k - m)^T,$$

where k is an integer;

means for calculating a set of orthonormal image vectors $w_i$, wherein the set of orthonormal image vectors $w_i$, are eigenvectors of a covariance matrix $C=P^T P$, where P is a matrix composed of mean centered images $m_i$, as column vectors, placed side by side;
means for forming a projection matrix W of order (MX T) from the set of orthonormal image vectors $w_i$ where T represents the total number of orthonormal image vectors $w_i$;
means for calculating a first projection matrix $W_{PCA}$ as $W_{PCA} = \arg_W{}^{max} |W^T S_T W|$;
means for calculating a membership grade of a j-th image vector in the i-th class $\mu_{ij}$ as $$\mu_{ij} = \alpha + \beta\left(\frac{n_{ij}}{k}\right)$$

if i is the same as a label of the j-th pattern, and as $$\mu_{ij} = \beta\left(\frac{n_{ij}}{k}\right)$$

if i is not the same as the label of the j-th pattern, where $n_{ij}$ represents a number of neighbors of the j-th vector that belong to the i-th class, k is an integer representing a number of nearest neighbors of the j-th image vector, and wherein $\beta=1-\alpha$, and α represents an offset in membership grading assigned to a vector in its class;
means for optimizing α using a genetic algorithm in order to minimize recognition error;
means for calculating a mean of all vectors belonging to the l-th class as $$\overline{m}_l = \frac{\sum_{j=1}^{N} \mu_{ij}^p x_j}{\sum_{j=1}^{N} \mu_{ij}^p},$$

where l is an integer;
means for calculating a between-class scatter matrix $S_B$ and a within-class scatter matrix $S_W$ as $$S_B = \sum_{i=1}^{C}\sum_{j=1}^{N} \mu_{ij}^p (\overline{m}_l - m)\cdot(\overline{m}_l - m)^T$$

and $$S_W = \sum_{i=1}^{C}\sum_{x_k \in X_i} \mu_{ij}^p (x_i - \overline{m}_l)\cdot(x_i - \overline{m}_l)^T,$$

respectively, where $X_i$, represents a set of samples belonging to the i-th class, $x_k$ is the k-th image of the i-th class, and i=1, 2, ..., c, where p is a fuzzy modifier which is a constant controlling influence of fuzzy membership degree;

means for calculating a second projection matrix $W_{LDA}$ as $$W_{LDA} = \arg\max_W \frac{|W^T S_B W|}{|W^T S_W W|};$$

means for calculating a total transformation matrix $W^T$ as $W^T = W_{LDA}{}^T \cdot W_{PCA}{}^T$;

means for calculating a set of test feature vectors $y'_k$ as $y'_k = W^T x'_k$;

means for calculating a set of training feature vectors $y_k$ as $y_k = W^T X_k$;

means for calculating a Euclidean distance between each of the test feature vectors $y'_k$ and each of the training feature vectors $y_k$; and means for calculating a classification based upon the calculated Euclidean distances.

8. The system of performing facial recognition as recited in claim 7, further comprising means for optimizing k using the genetic algorithm in order to minimize the recognition error.

9. The system of performing facial recognition as recited in claim 8, further comprising means for optimizing p using the genetic algorithm in order to minimize the recognition error.

10. A computer software product that includes a non-transitory storage medium readable by a processor, the non-transitory storage medium having stored thereon a set of instructions for performing facial recognition using genetic algorithm-modified fuzzy linear discriminant analysis, the instructions comprising:

(a) a first sequence of instructions which, when executed by the processor, causes the processor to establish a set of N test face images, where N is a non-zero, positive integer;

(b) a second sequence of instructions which, when executed by the processor, causes the processor to establish a set of N training face images;

(c) a third sequence of instructions which, when executed by the processor, causes the processor to calculate a mean vector of all test face images as $$m' = \frac{1}{N} \sum_{i=1}^{N} x'_i,$$

where $x'_i$ represents an i-th test face image vector having a size M', where i is an integer;

(d) a fourth sequence of instructions which, when executed by the processor, causes the processor to calculate a mean vector of all training face images as $$m = \frac{1}{N} \sum_{i=1}^{N} x_i,$$

where $x_i$ represents an i-th training face image vector having a size M;

(e) a fifth sequence of instructions which, when executed by the processor, causes the processor to calculate a total scatter matrix $S_T$ as $$S_T = \sum_{k=1}^{N} (x_k - m)(x_k - m)^T;$$

(f) a sixth sequence of instructions which, when executed by the processor, causes the processor to calculate a set of orthonormal image vectors $W_i$, wherein the set of orthonormal image vectors $w_i$, are eigenvectors of a covariance matrix $C = P^T P$, where P is a matrix composed of mean centered images $M_i$, as column vectors, placed side by side;

(g) a seventh sequence of instructions which, when executed by the processor, causes the processor to form a projection matrix W of order (M×T) from the set of orthonormal image vectors $w_i$, where T represents the total number of orthonormal image vectors $w_i$;

(h) an eighth sequence of instructions which, when executed by the processor, causes the processor to calculate a first projection matrix $W_{PCA}$ as $W_{PCA} = \arg_W{}^{max} |W^T S_T W|$;

(i) a ninth sequence of instructions which, when executed by the processor, causes the processor to calculate a membership grade of a j-th image vector in the i-th class $\mu_{ij}$ as $$\mu_{ij} = \alpha + \beta\left(\frac{n_{ij}}{k}\right)$$

if i is the same as a label of the j-th pattern, and as $$\mu_{ij} = \beta\left(\frac{n_{ij}}{k}\right)$$

if i is not the same as the label of the j-th pattern, where $n_{ij}$ represents a number of neighbors of the j-th vector that belong to the i-th class, k is an integer representing a number of nearest neighbors of the j-th image vector, and wherein $\beta = 1 - \alpha$, and $\alpha$ represents an offset in membership grading assigned to a vector in its class;

(j) a tenth sequence of instructions which, when executed by the processor, causes the processor to optimize a using a genetic algorithm in order to minimize recognition error;

(k) an eleventh sequence of instructions which, when executed by the processor, causes the processor to calculate a mean of all vectors belonging to the l-th class as $$\overline{m}_l = \frac{\sum_{j=1}^{N} \mu_{ij}^p x_j}{\sum_{j=1}^{N} \mu_{ij}^p},$$

where l is an integer;

(l) a twelfth sequence of instructions which, when executed by the processor, causes the processor to calculate a between-class scatter matrix $S_B$ and a within-class scatter matrix $S_W$ as $$S_B = \sum_{i=1}^{C} \sum_{j=1}^{N} \mu_{ij}^p (\overline{m}_l - m) \cdot (\overline{m}_l - m)^T$$

and $$S_W = \sum_{i=1}^{C} \sum_{x_k \in X_i} \mu_{ij}^p (x_i - \overline{m}_l) \cdot (x_i - \overline{m}_l)^T,$$

respectively, where X, represents a set of samples belonging to the i-th class, $x_k$ is the k-th image of the i-th class, and i=1, 2, . . . , c, where p is a fuzzy modifier which is a constant controlling influence of fuzzy membership degree;

(m) a thirteenth sequence of instructions which, when executed by the processor, causes the processor to calculate a second projection matrix $W_{LDA}$ as $$W_{LDA} = \underset{W}{\mathrm{argmax}} \frac{|W^T S_B W|}{|W^T S_W W|};$$

(n) a fourteenth sequence of instructions which, when executed by the processor, causes the processor to calculate a total transformation matrix $W^T$ as $W^T = W_{LDA}{}^T \cdot W_{PCA}{}^T$;

(o) a fifteenth sequence of instructions which, when executed by the processor, causes the processor to calculate a set of test feature vectors $y'_k$ as $y'_k = W^T x'_k$;

(p) a sixteenth sequence of instructions which, when executed by the processor, causes the processor to calculate a set of training feature vectors $y_k$ as $Y_k = W^T X_k$;

(q) a seventeenth sequence of instructions which, when executed by the processor, causes the processor to calculate a Euclidean distance between each of the test feature vectors $y'_k$ and each of the training feature vectors $y_k$; and (r) an eighteenth sequence of instructions which, when executed by the processor, causes the processor to calculate a classification based upon the calculated Euclidean distances.

11. The computer software product as recited in claim 10, wherein the instructions further comprise a nineteenth sequence of instructions which, when executed by the processor, causes the processor to optimize k using the genetic algorithm in order to minimize the recognition error.

12. The computer software product as recited in claim 11, wherein the instructions further comprise a twentieth sequence of instructions which, when executed by the processor, causes the processor to optimize p using the genetic algorithm in order to minimize the recognition error.

* * * * *